United States Patent

Jeanneret

[15] 3,668,953
[45] June 13, 1972

[54] STOP MECHANISMS FOR LATHES AND OTHER MACHINE TOOLS

[72] Inventor: Jules Louis Jeanneret, 13-21, rue Henri Gelin, 79 Niort, France

[22] Filed: May 14, 1970

[21] Appl. No.: 37,273

[30] Foreign Application Priority Data

May 21, 1969 France.................................6916590

[52] U.S. Cl..................................................82/22, 82/23
[51] Int. Cl.....................................................B23b 21/00
[58] Field of Search............................................82/23, 22, 5

[56] References Cited

UNITED STATES PATENTS 2,551,968  5/1951  Ruatti.........................................82/23

FOREIGN PATENTS OR APPLICATIONS 1,138,467  1/1957  France........................................82/5

Primary Examiner—Leonidas Vlachos
Attorney—Haseltine, Lake & Co.

[57] ABSTRACT

A stop mechanism for controlling the advance of a saddle of a screwcutting lathe comprises a cam mounted on a shaft operatively connected to a drive transmitting member. The cam has a ramped portion and is contacted by a pressure roller. When the saddle reaches a predetermined position along the lathe bed the cam is rotated causing the roller to contact the ramped portion and effect an abrupt further rotation of the cam. Rotation of the shaft during the abrupt rotation of the cam causes disengagement of the drive transmitting member from the drive of the saddle.

4 Claims, 6 Drawing Figures

STOP MECHANISMS FOR LATHES AND OTHER MACHINE TOOLS

BACKGROUND OF THE INVENTION

1. Field of the Invention

The present invention relates to a mechanism for controlling a driven part of a machine tool, and more particularly, but not exclusively to a mechanism for controlling the saddle of a screwcutting lathe.

2. Description of the Prior Art

In one screwcutting lathe proposed hitherto a nut, fixed to the saddle that carries the tool holder, is engaged with the lead screw of the lathe at the start of the cut and is disengaged also manually, when the desired length of thread has been cut.

The increase in cutting-speeds achieved by the use of carbide-tipped tools requires a faster longitudinal feed for the saddle. It has thus become very difficult to judge the precise point at which the manual disengagement of the nut should be effected.

SUMMARY OF THE INVENTION

According to the invention, there is provided a mechanism adapted for mounting on a driven part of a machine tool for disconnecting the drive to said part, said mechanism comprising a shaft, a cam rotatable with said shaft, said cam having first, second, and third cam surface portions, a roller biassed against said cam, said roller being in equilibrium with said cam when contacting said first or third cam surface portions and operable to abruptly rotate said cam when contacting said second surface portion in a sense to locate said third surface portion in contact with said roller, means operable to rotate said cam in said sense, said means being engageable with a stop mounted on a stationary part of said machine tool, and drive transmitting means operatively connected to said shaft so as to be engaged with said drive when said roller is in contact with said first surface-portion and to be disengaged from said drive when said roller is in contact with said third surface portion.

BRIEF DESCRIPTION OF THE DRAWINGS

An embodiment of the invention will now be described by way of example only, with reference to the accompanying diagrammatic drawings, in which.

DESCRIPTION OF THE PREFERRED EMBODIMENTS

Figure 1:
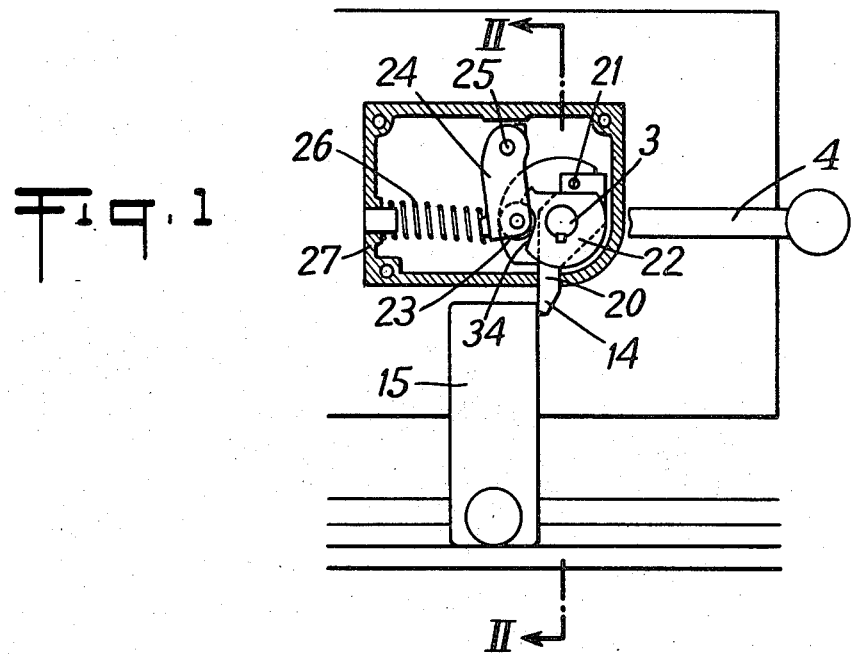
FIG. 1 is a side elevation view partially in section of a mechanism, in accordance with the invention mounted on the saddle of a screw-cutting lathe.
Figure 2:
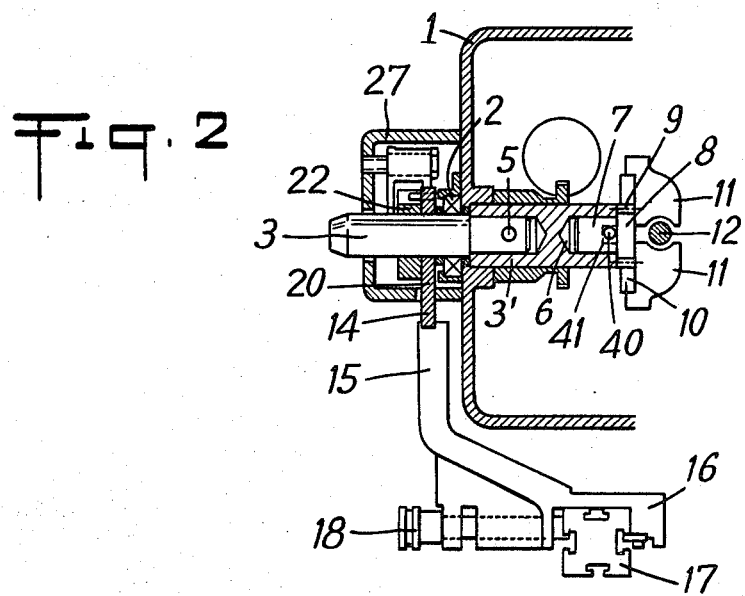
FIG. 2 is a section taken on line II—II of FIG. 1.

There is shown in FIGS. 1 and 2 a screw-cutting lathe comprising a saddle 1 which carries a tool holder longitudinally along the lathe bed (not shown). The saddle 1 has a bearing 2 rotatably supporting shaft 3 to one end portion of which is fixed an operating lever 4. A shaft 3' is keyed to the other end portion of the shaft 3' by a pin 5. The shaft 3 contains a bore 6 in which is mounted an operating spindle 7, the end 8 of which has gear teeth which form a pinion 9. The pinion 9 meshes with two racks 10, each carried by one half 11 of a split nut.

The split nut is arranged to engage a lead screw 12, and each half 11 of the nut is mounted for slidable movement in the saddle 1 in a direction transversly with respect to the lead screw whereby the halves 11 are movable towards each other or away from each other to respectively engage or disengage the lead screw 12.

Movement of the halves 11 towards each other or away from each other is effected by rotation of the operating spindle 7, whereby the racks 10 are moved in the appropriate direction. The two halves 11 are engaged manually with the lead screw 12 by downward movement of the lever 4 from the position in which it is shown in FIG. 1. Disengagement, however, takes place automatically when a catch 14, mounted on saddle 1, abuts against a stop 15, which is stationary in relation to the lathe bed.

As is clearly shown in FIG. 2, the stop 15 is mounted by means of a bracket 16 on a control slide 17 extending along the length of the lathe bed. The stop is locked to the slide 17 in a selected position by a screw 18. The catch 14 is carried by one end portion of a lever 20 pivotally mounted on the shaft 3 and the other end portion of the lever 20 carries a stud 21. Keyed to the shaft 3 is a cam 22 against which bears a pressure roller 23 mounted on an arm 24 which is pivotally mounted at 25 on the saddle 1. The roller 23 is biassed against the cam 22 by a compression spring 26. The end of the spring 26 remote from the roller 23 bears against a casing 27 fixed to the saddle so as to enclose and protect the mechanism, the mode of operation of which will now be explained.

Figure 3:
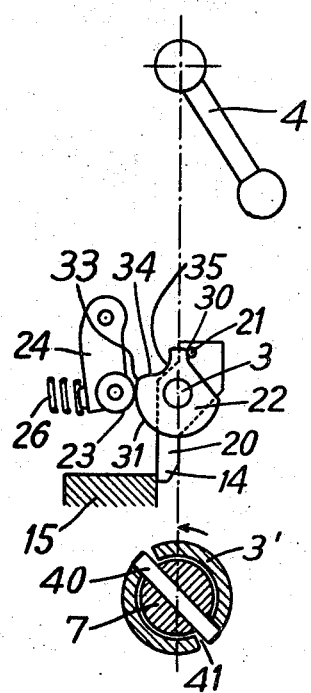
FIGS. 3, 4 and 5 show schematically the position occupied by parts of the mechanism during operation thereof.
Figure 4:
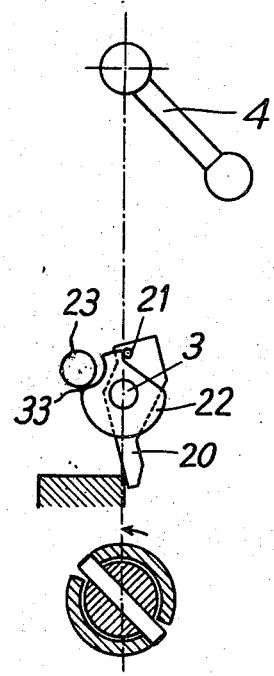
Figure 5:
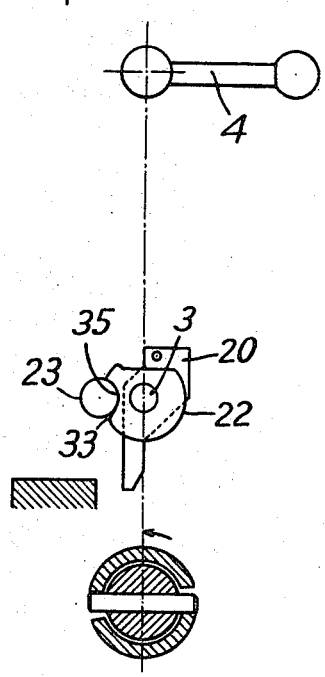

This explanation is related mainly to FIGS. 3, 4 and 5, which show the successive relative positions of the cam 22 and the roller 23 from the moment when, with the drive from the lead screw engaged (i.e. the lever 4 is in its lowermost position FIG. 3), the catch 14 engages the stop 15. In the engagement position, the lever 20 is vertical and the stud 21 bears against a portion 30 of the cam 22. The roller 23 is thrust, by the spring 26, against a substantially circular portion 31 of the cam 22 and is held in equilibrium with the cam 22. In this position, the roller is adjacent the start 33 of a ramped portion of the cam 22, which portion terminates in a concave portion 35. When the catch 14 engages the stop 15, the catch is pivoted about the shaft 3, and rotates the cam 22 by means of the stud 21, until the cam is rotated to the position shown in FIG. 4. In this position the roller 23 has just passed beyond the start 33 of the ramped portion 34. From the moment this position or "disengagement point" is reached, the equilibrium between the cam 22 and roller 23 ceases. Under the pressure of the roller 23 as it rolls along the ramped portion 34, the cam 22 is rotated abruptly to a "disengagement position" in which the roller 23 is retained in the concave portion 35 (FIG. 5). The mechanism shown in FIG. 1 is in this configuration.

During the movement of the cam into the position in which the roller 23 is retained in the concave portion, the lever 4 keyed to the shaft 3 is moved from the position indicated in FIGS. 3, through the position shown in FIG. 4 to the position shown in FIG. 5. Also rotation of the shaft 3 causes the operating spindle 7 to rotate so that the halves 11 of the split nut are disengaged from the lead screw 12, thereby terminating motion of the saddle 1. It should be noted that only a small angular movement of the lever 20, between the engaged position and the point of disengagement, is sufficient to cause very abrupt disengagement. Thus the screw cutting can be accurately terminated.

To avoid causing disengagement of the halves 11 of the split nut from the lead screw 12 when the cam 22 has begun its abrupt movement, the spindle 7 is fitted within the bore 6 in the shaft 3' by means of a pin 40 received in an aperture 41 in the shaft 3, the aperture 41 being larger than the pin 40 so as to permit a limited degree of angular play between the spindle 7 and the shaft 3', (FIGS. 3 to 5).

Between the engagement position in FIG. 3 and the point of disengagement in FIG. 4, the lever 20 is pivoted through a small angle, bringing the start 33 of the ramped portion of the cam 22 into contact with the roller 23. The pivotal movement causes the shaft 3 and shaft 3' to rotate by the same amount, the spindle 7 remaining stationary because of the play between the pin 40 and the aperture 41. As stated before, the pressure of the roller 23 then causes the cam 22 to rotate abruptly, and only during this abrupt movement will the spindle 7 be rotated to move the halves 11 apart.

FIG. 5 shows the position of the parts upon completion of the disengagement of the drive. Thus, it will be noted that when the catch 14 engages the stop 15, rotation of the lever 20 does not result in immediate disengagement.

Figure 6:
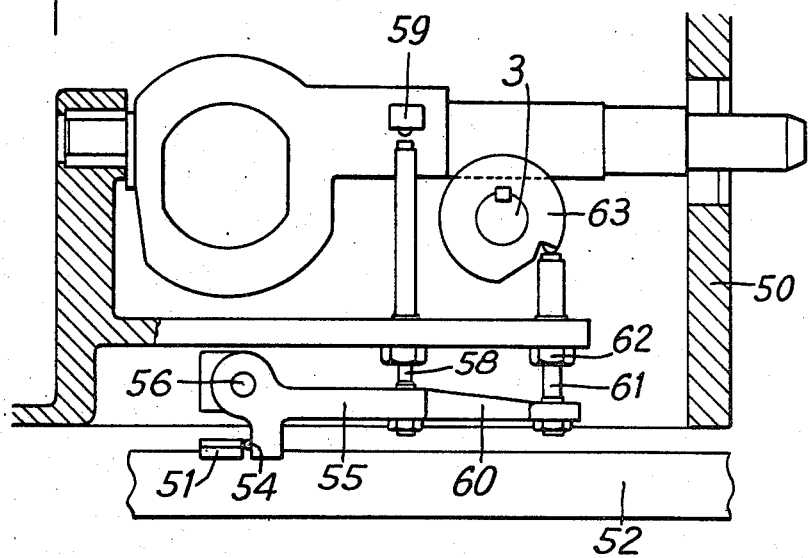
FIG. 6 illustrates the manner in which the mechanism shown in FIG. 1 can be incorporated in a lathe having an automatic stop mechanism for the saddle.

FIG. 6 shows the manner in which the mechanism can be incorporated into a saddle with an existing automatic stop mechanism. The lathe has a saddle 50 and a stop mechanism, for limiting feed of the saddle, which is operated when a catch 54 on a bell-crank 55, pivoted about a pin 56 mounted on the saddle 50, engages an adjustable stop 51 mounted on a slide extending along the length of the lathe bed. When, as the saddle 50 advances, the catch 54 is engaged with the stop 51, the bell-crank 55 is pivoted and actuates a push rod 58, to contact a stop 59 whereby the drive for the saddle is disengaged. When utilized in this type of lathe, the stop mechanism described in connection with FIGS. 1 to 5 is operated by the bell-crank 55 acting in conjunction with a stop similar to the stop 51. The crank 55 is extended by an arm 60 on the end portion of which is mounted a push rod 61. The push rod 61, which is guided in a bush 62 mounted on the saddle bears against the stepped periphery of a disc 63 keyed to the shaft 3. As the saddle is advanced during cutting of a thread the catch 54 engages the stop 51 and pivots the crank 55 and hence, by means of the push rod 61 rotates the disc 63 and thus the shaft 3.

I claim:

1. A mechanism adapted for being mounted on a movable part of a machine tool for disengaging the part from a drive therefor, said mechanism comprising means carried by the movable part to sense the position of an adjustable stop at which the movable part is to be halted, a rotatable shaft supported by the movable part, means carried by said shaft for engaging or disengaging the movable part with the drive therefor dependent upon the angular position of said shaft, a cam rotatable with said shaft and including first, second and third cam surface portions, a roller carried by the movable part and urged against the cam, said cam having two positions of stable equilibrium when contacted by the roller at said first and second cam surface portions corresponding respectively to engaged and disengaged conditions of the movable part with respect to the drive therefor, said second cam surface portion being a ramped portion which when engaged by the roller is abruptly rotated thereby to bring the shaft to the position in which the movable part is disengaged from the drive, said means for sensing the position of the stop including a lever mounted for pivotal movement, and a pin on said lever facing said cam to rotate the cam when the stop has been sensed to bring the ramped portion of the cam into contact with the roller.

2. A mechanism as claimed in claim 1 comprising means connecting said shaft to said cam for common rotation while allowing a limited degree of relative angular movement therebetween whereby said cam is rotated relative to said shaft when the ramped portion has been brought into contact with said roller.

3. A mechanism as claimed in claim 1 wherein said lever is mounted for pivotal movement about the axis of rotation of the shaft.

4. A mechanism as claimed in claim 1 wherein the machine tool is a lathe and the movable part is a saddle, said lever comprising a bell crank lever extending longitudinally in the direction of travel of the slide, and a push rod connected to said arm of the bell crank lever and carrying said pin which rotates the cam.

* * * * *